US012020559B2

(12) United States Patent
Okabe et al.

(10) Patent No.: US 12,020,559 B2
(45) Date of Patent: Jun. 25, 2024

(54) TACTILE PRESENTATION DEVICE, AND TACTILE PRESENTATION METHOD

(71) Applicant: Nippon Telegraph and Telephone Corporation, Tokyo (JP)

(72) Inventors: Yuichi Okabe, Tokyo (JP); Toshishige Shimamura, Tokyo (JP); Yoshiyuki Doi, Tokyo (JP); Yuzo Ishii, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 45 days.

(21) Appl. No.: 17/626,441

(22) PCT Filed: Jul. 17, 2019

(86) PCT No.: PCT/JP2019/028056
§ 371 (c)(1),
(2) Date: Jan. 11, 2022

(87) PCT Pub. No.: WO2021/009864
PCT Pub. Date: Jan. 21, 2021

(65) Prior Publication Data
US 2022/0237995 A1    Jul. 28, 2022

(51) Int. Cl.
*G08B 6/00*        (2006.01)
*G06F 3/01*        (2006.01)
(52) U.S. Cl.
CPC .............. *G08B 6/00* (2013.01); *G06F 3/016* (2013.01)
(58) Field of Classification Search
CPC ............ G08B 6/00; G06F 3/016; G06F 3/014
See application file for complete search history.

(56) References Cited

U.S. PATENT DOCUMENTS

| | | | | |
|---|---|---|---|---|
| 2012/0289948 A1* | 11/2012 | Youngquist | ............ | A61B 18/20 |
| | | | | 606/9 |
| 2014/0022162 A1* | 1/2014 | Yu | ........................ | A61N 5/0622 |
| | | | | 345/156 |
| 2016/0007009 A1* | 1/2016 | Offenberg | ............ | H04N 13/254 |
| | | | | 348/46 |

FOREIGN PATENT DOCUMENTS

| | | | |
|---|---|---|---|
| JP | 2017228564 A | * | 12/2017 |
| JP | 2017228564 A | | 12/2017 |

(Continued)

OTHER PUBLICATIONS

Mid-Air Tactile Stimulation Using Indirect Laser Radiation. IEEE Transactions on Haptics [online], vol. 9, No. 4, IEEE, Oct.-Dec. 2016, pp. 574-585.*

(Continued)

*Primary Examiner* — Quan Zhen Wang
*Assistant Examiner* — Mancil Littlejohn, Jr.
(74) *Attorney, Agent, or Firm* — Slater Matsil, LLP

(57) ABSTRACT

A tactile sensation presentation device includes a light source that emits a laser beam toward a test site that is a region of a skin surface of a biological object and a control device that generates a control signal that controls the light source and causes the light source to emit the laser beam in a modulated manner. The laser beam emitted from the light source in a manner modulated in accordance with the control signal from the control device whereby the test site is irradiated is absorbed at the test site and generates a pressure wave that is a thermoelastic wave by the photoacoustic phenomenon.

19 Claims, 15 Drawing Sheets

(56) References Cited

FOREIGN PATENT DOCUMENTS

| KR | 20170052319 A | * | 5/2017 | ............... | G06F 3/01 |
|----|---------------|---|--------|-----------------|-----------|
| KR | 20170052319 A |   | 5/2017 |                 |           |

OTHER PUBLICATIONS

Lee et al. (NPL: Mid-Air Tactile Stimulation Using Indirect Laser Radiation. IEEE Transactions on Haptics [online], vol. 9, No. 4, IEEE, 2016, pp. 574-585) Oct.-Dec. 2016.*

Cerevo Inc., "Taclim, the VR haptic feedback system for human limbs that further immerses you in VR worlds," https://cerevo.com/en/, Jul. 2, 2019, 5 pages.

Hojin Lee, et al., "Mid-Air Tactile Stimulation Using Indirect Laser Radiation," IEEE Transactions on Haptics, vol. 9, No. 4, Oct.-Dec. 2016, 12 pages.

Hojun Cha et al., "Mid-air Tactile Display Using Indirect Laser Radiation for Contour-Following Stimulation and Assessment of Its Spatial Acuity," 2017 IEEE World Haptics Conference (WHC), Jun. 6, 2017, 6 pages.

Ultraleap, "Stratos Inspire, Attach and Amaze," https://www.ultrahaptics.com/products-programs/stratos-inspire/, Jul. 2, 2019, 7 pages.

* cited by examiner

TACTILE PRESENTATION DEVICE, AND TACTILE PRESENTATION METHOD

This patent application is a national phase filing under section 371 of PCT Application No. PCT/JP2019/028056, filed on Jul. 17, 2019, which application is hereby incorporated herein by reference.

TECHNICAL FIELD

The present invention relates to a tactile sensation presentation device and a tactile sensation presentation method, and more particularly relates to haptics technology.

BACKGROUND

In recent years there have been an increasing number of attempts to perform sensory presentation regarding tactile sensation, in addition to visual sensation and auditory sensation, in order to improve sensation of presence and so forth. For example, attempts have been made to generate cross-modal phenomena by combining visual sensation, auditory sensation, and tactile sensation experiences, in order to improve virtual reality (VR) experiences.

In particular, with regard to tactile sensation experience, there has been advancement of development of haptics technology in recent years, in which tactile sensation is reproduced by applying force, vibrations, movement, and so forth, to a user.

For example, NPL 1 discloses a tactile sensation presentation device provided with a mechanism in which a controller, which has a form that is gripped by the user or worn on the feet of the user like shoes, vibrates. The technology described in NPL 1 combines tactile sensation feedback by vibration with audiovisual sensation experience of the user in a VR space, to improve the VR experience of users. There are other forms of conventional tactile sensation presentation devices that are in the form of a glove by which the user can wear a plurality of actuators, a pen, or a planar form that is deformable, to present tactile sensation feedback to the user.

In such conventional tactile sensation presentation devices, tactile sensation information is presented to the user by the user being physically in contact with part of a machine, such as a tactile sensation presentation device or the like. The user is required to be in contact with part of the device, and accordingly usage scenes of conventional tactile sensation presentation devices tend to be limited.

Accordingly, NPL 2, for example, discloses technology for presenting users with tactile sensation feedback using ultrasound waves propagated through the air. In the technology described in NPL 2, acoustic radiation force is applied to a target in the air using a phase array of ultrasound transducers, instead of using a configuration that appeals to tactile sensation by the user coming into contact with a part of a device. Ultrasound waves arrive at the skin and thereafter reach the tactile receptors, creating a vibrational sensation on the skin of the user.

CITATION LIST

Non Patent Literature

[NPL 1] Cerevo Inc., "VR haptic feedback system Taclim", [online], [Searched Jul. 2, 2019], Internet <URL: https://taclim.cerevo.com/en/>.

[NPL 2] Ultrahaptics, "STRATOS™ Inspire haptic module", [online], [Searched Jul. 2, 2019], Internet <URL: https://www.ultrahaptics.com/products-programs/stratos-inspire/>.

SUMMARY

Technical Problem

However, in the technology disclosed in NPL 2, the transducers serving as the ultrasound generation source are disposed across air or the like from the surface of the skin of the user. Generated ultrasound waves are greatly affected by change in the air serving as the medium, such as the flow thereof, or the like, in the process of propagation, and accordingly there have been cases in which the direction of propagation of the ultrasound waves changed, or scattering or attenuation of intensity, or the like occurred, and accurate tactile sensation feedback could not be realized.

Embodiments of the present invention have been made to solve the above-described problem, and it is an object thereof to realize more accurate tactile sensation feedback.

Means for Solving the Problem

In order to solve the above-described problem, a tactile sensation presentation device according to embodiments of the present invention includes an electromagnetic wave source that emits an electromagnetic wave toward a region of a skin surface of a biological object, and a control device that generates a control signal that controls the electromagnetic wave source, and causes the electromagnetic wave source to emit the electromagnetic wave in a modulated manner. The electromagnetic wave emitted from the electromagnetic wave source in a manner modulated in accordance with the control signal from the control device whereby the region of the skin surface is irradiated is absorbed at the region of the skin surface, and generates a pressure wave that is a thermoelastic wave by the photoacoustic phenomenon.

In order to solve the above-described problem, a tactile sensation presentation method according to embodiments of the present invention includes a first step of generating a control signal that controls an electromagnetic wave source, and causes the electromagnetic wave source to emit the electromagnetic wave in a modulated manner, and a second step of emitting the electromagnetic wave from the electromagnetic wave source toward a region of a skin surface of a biological object. The electromagnetic wave, emitted from the electromagnetic wave source in the second step in a manner modulated in accordance with the control signal generated in the first step, whereby the region of the skin surface is irradiated, is absorbed at the region of the skin surface, and generates a pressure wave that is a thermoelastic wave by the photoacoustic phenomenon.

Effects of Embodiments of the Invention

According to embodiments of the present invention, electromagnetic waves emitted modulated from the electromagnetic wave source, and by which a region of the skin surface is irradiated, are absorbed at the region of the skin surface, and generate pressure waves that are thermoelastic waves by the photoacoustic phenomenon, and accordingly more accurate tactile sensation feedback can be realized.

DETAILED DESCRIPTION OF ILLUSTRATIVE EMBODIMENTS

Figure 1:
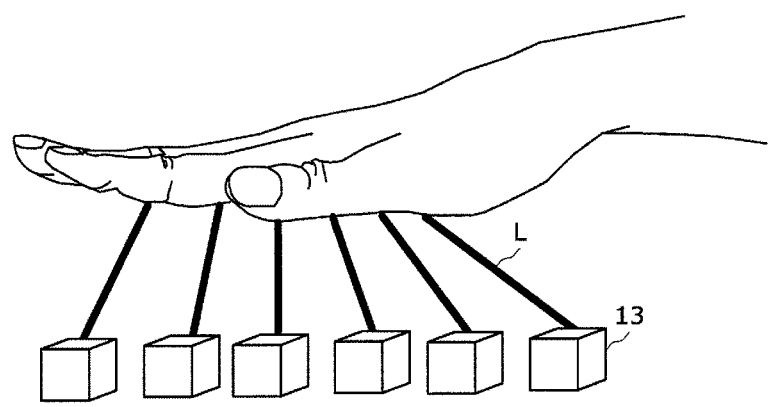
FIG. 1 is a schematic diagram for describing an overview of a tactile sensation presentation device according to an embodiment of the present invention.

Preferred embodiments of the present invention will be described in detail below, with reference to FIG. 1 through FIG. 25.

Overview of Tactile Sensation Presentation Device

First, an overview of a tactile sensation presentation device 1 according to an embodiment of the present invention will be described. When an object such as a biological object is irradiated by electromagnetic waves such as light or the like, and molecules included in the tissue in the irradiated region absorb the electromagnetic waves, that portion is locally heated and thermal expansion occurs, and sound waves are generated. This is referred to as the photothermal effect. Also, by intermittently irradiating the object by electromagnetic waves such as light or the like, the thermal expansion of the volume of the object due to heating is also intermittent, and compressional waves that are thermoelastic waves can be generated. This is referred to as the photoacoustic effect.

The compressional waves generated by the photoacoustic effect are propagated through the medium as acoustic waves or as pressure waves. Note that in the following, acoustic waves and pressure waves will be collectively referred to as pressure waves. Also, in the present embodiment, an intermittent laser beam, in which light from a light source serving as electromagnetic waves such as light or the like is cyclically intensity-modulated, is used. Pressure waves generated in the object by the photoacoustic effect are generated at a frequency corresponding to the modulation frequency of light from the light source. This pressure wave $|P_t|$ is roughly represented by the following Expression (1) (Reference 1: WO 2005/107592).

Expression (1)

$$|P_t| = \frac{E\alpha\beta}{C_P \tau_L^{3/2}} \left(\frac{v}{r}\right)^{1/2} \tag{1}$$

In the above Expression (1), light energy: E, coefficient of light absorption: a, coefficient of thermal expansion: $\beta$, isobaric specific heat: $C_p$, pulse width of light: $\tau_L$, speed of sound: v, and distance from position where object is irradiated by light to pressure wave detection position: r, are used for representation.

As illustrated in the above Expression (1), in accordance with the intensity of the light energy E, the intensity of the pressure wave generated by the photoacoustic effect also changes. Also, the intensity of the pressure wave can also be controlled by the way in which the wavelength of light by which the object is to be irradiated is selected, since the pressure wave is also dependent on the coefficient of light absorption $\alpha$.

In the tactile sensation presentation device 1 according to the present embodiment, a region on the skin surface of the user is irradiated by electromagnetic waves that can generate pressure waves near the skin of the user by the above-described photoacoustic effect, emitted from a light source (electromagnetic wave source) 13. Impact of the pressure waves generated near the skin of the user stimulate the tactile receptors in the skin of the user, realizing tactile sensation feedback to the user.

Note that in the present specification, "tactile sensation" refers to, of human visual sensation, auditory sensation, equilibrium sensation, olfactory sensation, gustatory sensation, tactile sensation, pain sensation, warm sensation, and cold sensation, tactile sensation that is an external mechanical stimulus. Also, the receptor of "tactile sensation" is the skin, including tactile receptors included in the epidermis, the dermis, and the subcutis. Also, "sensation" is a skin sensation induced in response to stimulus received at the skin (receptors), and includes tactile sensation, pressure sensation, pain sensation, warm sensation, and cold sensation.

FIG. 1 illustrates an overview of the tactile sensation presentation device 1 according to the present embodiment. According to the tactile sensation presentation device 1, a region on the surface of the skin of the user is irradiated by a laser beam L generated by modulating the light of the light source 13. Pressure waves due to the photoacoustic effect are generated near the skin of the user irradiated by the laser beam L. Conversely, with a tactile sensation presentation device according to a conventional example illustrated in FIG. 2, a phase array of ultrasound transducers 300, for example, is used to generate acoustic radiation force in the air between the ultrasound transducers 300 and the skin of the user, thereby presenting a vibrational tactile sensation on the skin of the user by the ultrasound waves arriving at the skin.

Figure 2:
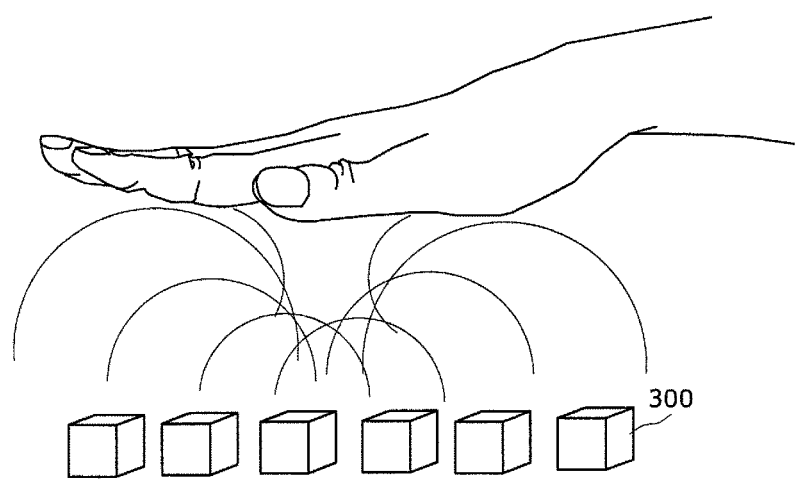
FIG. 2 is a schematic diagram for describing an overview of a tactile sensation presentation device according to a conventional example.

In the tactile sensation presentation device 1 according to the present embodiment, pressure waves are generated near the skin, at a location closer to the tactile receptors which are to be stimulated, and accordingly is less susceptible to effects of change in light intensity or the like due to change in the air that is the medium between the light source 13 and the skin of the user, in comparison with the conventional example illustrated in FIG. 2.

First Embodiment

Figure 3:
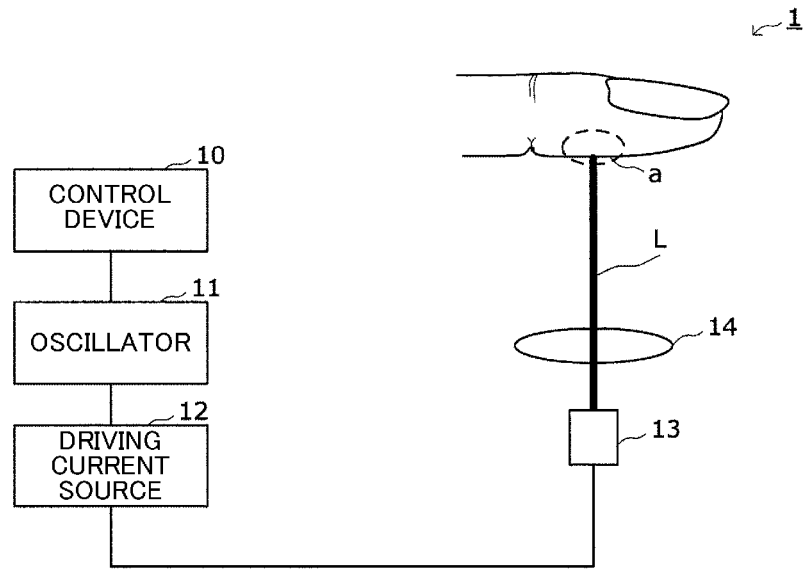
FIG. 3 is a block diagram illustrating a configuration of a tactile sensation presentation device according to a first embodiment.

Next, the configuration of the tactile sensation presentation device 1 according to the first embodiment will be described with reference to FIG. 3. The tactile sensation presentation device 1 is provided with a control device 10, an oscillator 11, a driving current source 12, the light source 13, and a lens 14.

The control device 10 generates control signals for causing the oscillator 11 to oscillate at a desired frequency of an oscillation waveform, and sends the generated control signals to the oscillator 11. The control device 10 can generate and output control signals on the basis of signals indicating the oscillation waveform and oscillation frequency of the oscillator 11, externally accepted by a later-described input device 107, for example. The control device 10 can also perform overall control of the tactile sensation presentation device 1, such as performing initial settings and so forth of the oscillator 11, the driving current source 12, the light source 13, and the lens 14.

The oscillator 11 outputs electrical signals having the oscillation frequency and oscillation waveform corresponding to the control signals. The electrical signals output by the oscillator 11 are input to the driving current source 12 as modulation signals.

The driving current source 12 supplies driving current to the light source 13 so as to be driven, on the basis of the modulation signals from the oscillator 11. More specifically, the driving current source 12 performs cyclic intensity modulation of the laser beam emitted from the light source 13.

The light source 13 emits the laser beam L, which is cyclically intensity-modulated under the driving current from the driving current source 12, toward a test site a that is a region of the surface of the skin of the user. A semiconductor laser, for example, is used for the light source 13.

The lens 14 passes the laser beam L emitted from the light source 13 therethrough, and shapes the form of the laser beam L. The test site a is irradiated by the laser beam L transmitted through and beam-shaped by the lens 14. A rod lens or the like, for example, can be used as the lens 14. Also, an optical device such as a diffractive grating or the like may be used instead of the lens 14.

Figure 4:
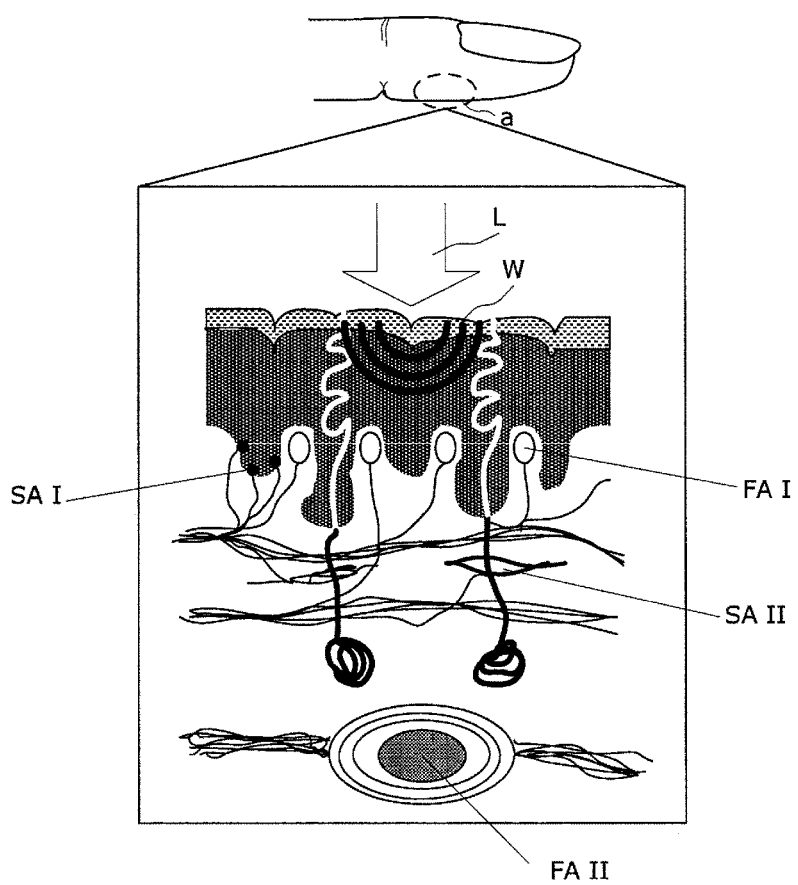
FIG. 4 is a diagram for describing a test site according to the first embodiment.

Upon being irradiated by the laser beam L that has been transmitted through the lens 14 and has been cyclically intensity-modulated, the light of the laser beam L is absorbed at the test site a as illustrated in FIG. 4, thereby generating pressure waves W due to the photoacoustic phenomenon associated therewith. The pressure waves W are generated at a frequency corresponding to the modulation frequency of the laser beam L, as described earlier.

The pressure waves W generated at the test site a by the photoacoustic effect are propagated through the tissue in the test site a, and arrive at the tactile receptors (SA I, SA II, FA I, FA II) within the skin of the user. The tactile receptors within the skin respond to the stimulus by the pressure waves W, and the respective tactile receptors detect tactile sensation. Thus, tactile sensation feedback is presented to the user.

The form of the pressure waves generated at the test site a can be controlled by controlling the modulated signals of the laser beam L emitted from the light source 13. Generally, pressure waves having a sine waveform such as illustrated in the lower tier in FIG. 5 can be generated at the test site a, by performing intensity modulation of light, by waveforms such as square waves, pulse waves, or the like, as illustrated in the upper tier in FIG. 5.

Figure 5:
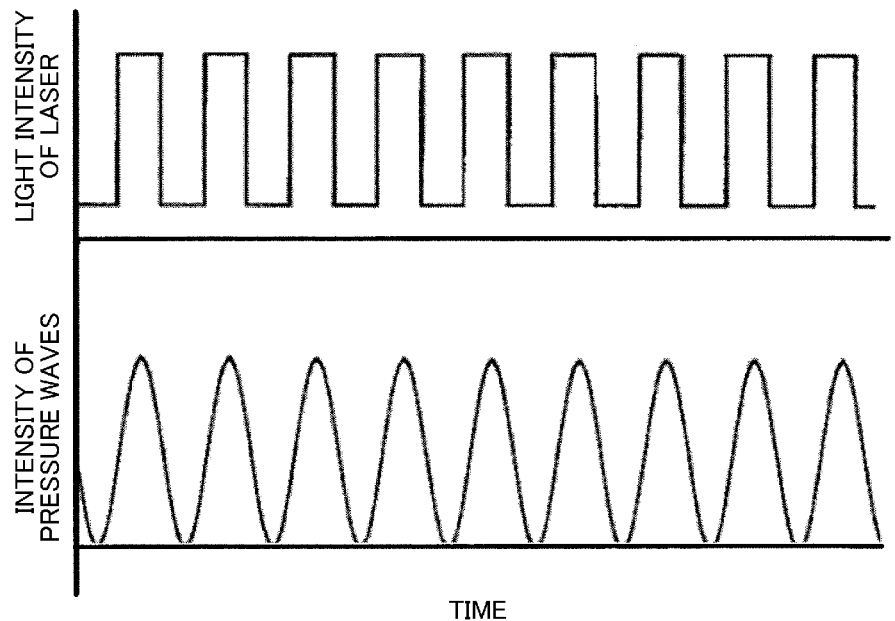
FIG. 5 is a diagram for describing a laser beam and pressure waves according to the first embodiment.

Also, by temporally changing the intensity of light energy of the laser beam L emitted from the light source 13, the intensity of pressure waves can be changed accordingly, and the user can be presented with contrasting intensities of the stimulus. For example, in a case in which the laser beam L emitted from the light source 13 is modulated according to set light intensity as illustrated in FIG. 5, the intensity of the pressure waves can be changed by further changing the intensity of the light.

Computer Configuration of Control Device

Next, an example of a computer configuration that realizes the control device 10 having the above-described functions will be described with reference to FIG. 6.

Figure 6:
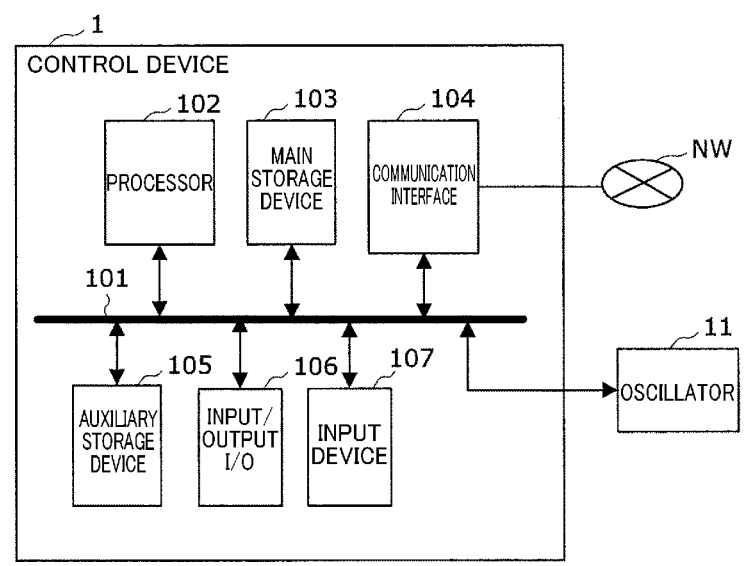
FIG. 6 is a block diagram illustrating an example of a computer configuration that realizes a control device according to the first embodiment.

As illustrated in FIG. 6, the control device 10 can be realized by, for example, a computer provided with a processor 102, a main storage device 103, a communication interface 104, an auxiliary storage device 105, an input/output I/O 106, and the input device 107, which are connected via a bus 101, and a program that controls these hardware resources. The oscillator 11 is also connected to the control device 10 via the bus 101.

A program for the processor 102 to perform various types of control and computation is stored in the main storage device 103 in advance. Functions of the control device 10, including generating control signals, are realized by the processor 102 and the main storage device 103.

The communication interface 104 is an interface circuit for performing communication with various types of external electronic equipment via a communication network NW.

As for the communication interface 104, a communication control circuit and an antenna, which conform to wireless data communication standards such as, for example, LTE, 3G, 5G, wireless LAN, Bluetooth (registered trademark), and so forth, are used. Settings information relating to modulation signals of the laser beam may be externally received via the communication interface 104, for example.

The auxiliary storage device 105 is configured of a recording medium that can be read from and written to, and a drive device for reading and writing various types of information, such as programs and data, from and to the recording medium. A hard disk and semiconductor memory such as flash memory can be used as the storage medium for the auxiliary storage device 105.

The auxiliary storage device 105 has a program storage region that stores a program for the control device 10 to generate control signals and perform tactile sensation presentation processing. The auxiliary storage device 105 may have a backup region or the like for backup of the aforementioned data and programs, or the like, for example.

The input/output I/O 106 is configured of an I/O terminal that inputs signals from external equipment, and outputs signals to external equipment.

The input device 107 is realized by a keyboard or touch panel, and generates operation signals in accordance with key operations or touch operations. The input device 107 accepts input relating to modulation signals, and generates corresponding signals.

Tactile Sensation Presentation Method

Figure 7:
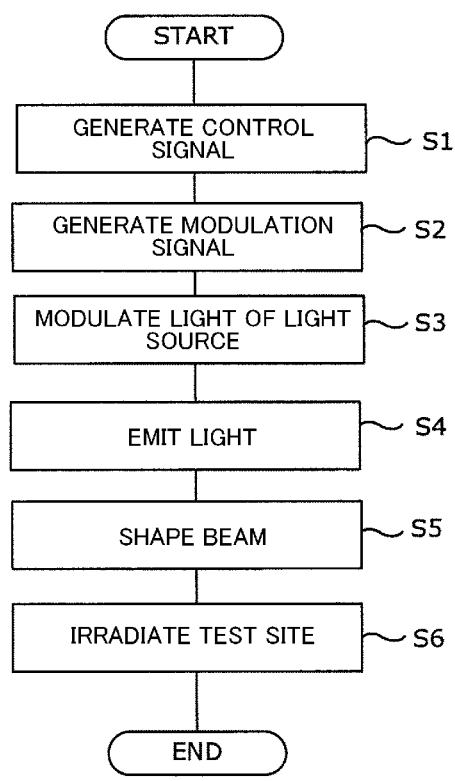
FIG. 7 is a diagram for describing operations of the tactile sensation presentation device according to the first embodiment.

Next, operations of the tactile sensation presentation device 1 having the above-described configuration will be described with reference to the flowchart in FIG. 7. An assumption will be made in the following that settings regarding control signals have been made in advance. Also, an assumption will be made that the test site a such as a finger of the user or the like is set at an irradiation position of the laser beam in advance.

First, the control device 10 generates control signals for the oscillator 11 on the basis of settings regarding control signals (step S1). Next, the oscillator 11 oscillates at the oscillation waveform and oscillation frequency corresponding to the control signals, and generates modulation signals (step S2).

The driving current source 12 supplies driving current to the light source 13 and cyclically modulates the intensity of the laser beam L emitted from the light source 13, in accordance with the modulation signals (step S3). Thereafter, the light source 13 emits the laser beam L toward the test site a (step S4). The laser beam L emitted from the light source 13 passes through the lens 14, and the beamform is shaped (step S5). Thereafter, the test site a is irradiated by the beam-shaped laser beam L emitted from the lens 14 (step S6).

When the test site a of the surface of the skin of the user is irradiated by the laser beam L in this way, the light is absorbed by molecules making up the tissue within the skin at the test site a, and pressure waves are generated by the photoacoustic effect. These pressure waves stimulate the tactile receptors near the skin, thereby presenting the user with tactile sensation feedback.

As described above, according to the tactile sensation presentation device 1 of the first embodiment, the laser beam L emitted from the light source 13 is cyclically intensity-modulated to have a cycle and light intensity set in advance, and accordingly tactile sensation feedback can be presented more accurately.

Modification of First Embodiment

A modification of the first embodiment of the present invention will be described next. The configuration of the tactile sensation presentation device 1 according to the present embodiment is the same as the first embodiment. In the following description, configurations that are the same as in the above-described first embodiment are denoted by the same signs, and description thereof will be omitted.

In the present modification, a particular frequency is used for the modulation frequency for cyclic intensity modulation of the laser beam L emitted from the light source 13. Anatomical positions of tactile receptors at the test site a of the user and positions where pressure waves are generated by the photoacoustic effect are correlated by modulating the laser beam L at the particular frequency.

Tactile receptors present in tissue near the skin of the users generally are Merkel cells (SA I), Meissner corpuscles (FA I), Ruffini endings (SA II), and Pacinian corpuscles (FA II), as illustrated in FIG. 4.

Merkel cells (SA I) and Meissner corpuscles (FA I) are present at a boundary portion of the epidermis and the dermis. Ruffini endings (SA II) are present in the dermis. Pacinian corpuscles (FA II) are present in the subcutis. These tactile receptors differ from each other with regard to the anatomical positions thereof and the frequency of pressure waves that can be sensed (Reference 2: MAENO Takashi "Structure and Function of Finger Pad and Tactile Receptors" Journal of the Robotics Society of Japan 02891824 The Robotics Society of Japan 2000-09-15 18 6 772-775<https://ci.nii.ac.jp/naid/10004734219/en/10.7210/jrsj.18.772, FIG. 2, FIG. 3>, Reference 3: Shimojo Makoto "Hito no Syokkaku no Mekanizumu (Mechanism of Human Tactile Sensation)" [online], [Searched Jul. 2, 2019], Internet <http://www.rm.mce.uec.ac.jp/sice/2006HapticsCommiteePPt.pdf>).

Frequency characteristics of pressure waves that Merkel cells (SA I) can sense are almost flat at 0.4 to 100 [Hz]. Merkel cells (SA I) have functions of detecting intensity such as pressure, detecting spatial patterns, and detecting skin curvature.

Meissner corpuscles (FA I) have a range around 10 to 200 [Hz], the same as with Merkel cells (SA I), but the threshold value for vibration detection is approximately one tenth in the frequency range around several 10s of [Hz]. Accordingly, sensitivity as to vibrations no lower than several 10s of [Hz] is higher as compared to Merkel cells (SA I). Meissner corpuscles (FA I) also have functions of detecting velocity, detecting spatial patterns, and detecting change in skin curvature.

Ruffini endings (SA II) have frequency characteristics (0.4 to 100 [Hz]) the same as with Merkel cells (SA I). Ruffini endings (SA II) have functions of detecting tension of the skin.

Pacinian corpuscles (FA II) have frequency properties of 10 to 1000 [Hz], with the threshold value of vibration detection decreasing as the frequency increases, and reaches the minimal value around 100 to 300 [Hz]. This indicates a higher sensitivity at frequencies at 100 [Hz] and higher. Pacinian corpuscles (FA II) have functions of detecting acceleration and detecting vibration.

In this way, the above four tactile receptors have different anatomical positions, i.e., depths from the skin surface, and are appropriated different frequency bands and physical amounts that each can sense. Considering the tactile receptors as a whole, it can be said that frequencies that humans can sense generally fall within a range of 0.1 [Hz] to 10 [kHz], even when taking individual differences into consideration.

In light of the above, the tactile sensation presentation device 1 according to the present modification performs intensity modulation of the laser beam emitted from the light source 13 by modulation frequency in the range of 0.1 [Hz] to 10 [kHz]. Setting the range of modulation frequency in this way enables particular tactile receptors to be targeted. Accordingly, the tactile sensation feedback presented to the user can be precisely controlled.

More specifically, the control device 10 generates control signals for the oscillator 11 so that the modulation frequency is in the range of 0.1 [Hz] to 10 [kHz]. The control device 10 can also generate control signals for changing the modulation frequency according to an order set in advance.

For example, dropping the modulation frequency from a state in which a stimulus is being generated for Pacinian corpuscles (FA II) by pressure waves of a frequency 100 [Hz] to a modulation frequency of 10 [Hz] can be performed to intentionally change the stimulus to that for Merkel cells (SA I). Thus, by changing the modulation frequency of the laser beam L emitted from the light source 13 temporally, the user can be induced to experiencing richer tactile sensations.

Also, by using a plurality of modulation frequencies, a plurality of tactile sensations can be acted upon at the same time.

Second Embodiment

Next, a second embodiment of the present invention will be described. In the following description, configurations that are the same as in the above-described first embodiment are denoted by the same signs, and description thereof will be omitted.

A case has been described in the first embodiment in which the laser beam emitted from the light source 13 is cyclically intensity-modulated. However, in the second embodiment, a wavelength-variable light source (wavelength-variable electromagnetic wave source) is used as the light source 13. Other configurations of the tactile sensation presentation device 1 according to the second embodiment are the same as the configurations of the first embodiment.

Figure 10:
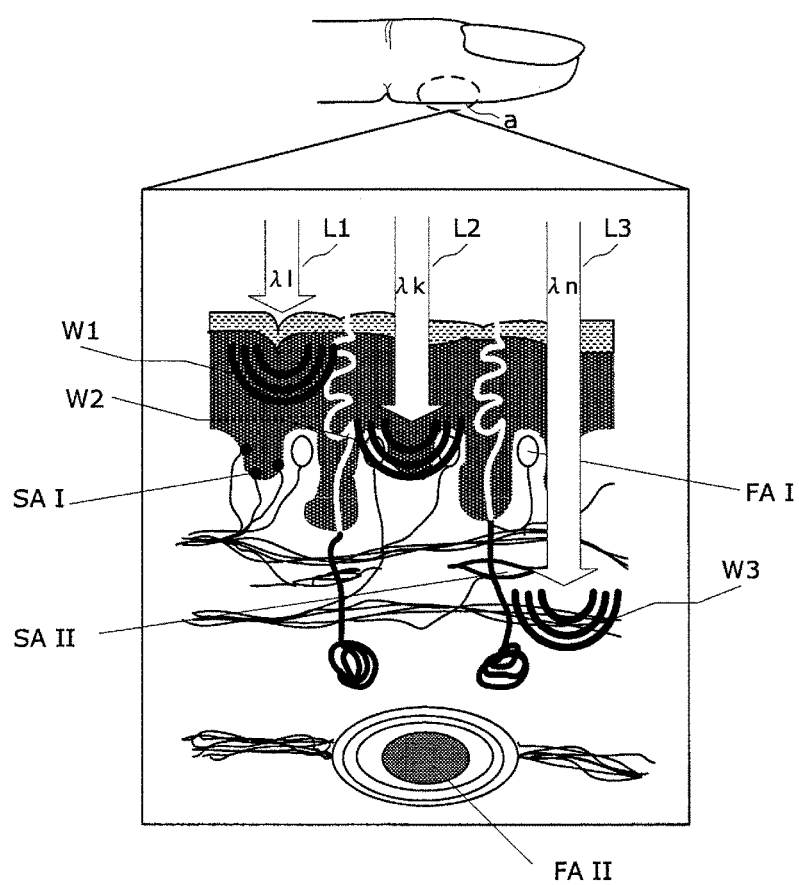
FIG. 10 is a diagram for describing operations of a tactile sensation presentation device according to the second embodiment.

As described above, the tactile receptors at the test site a near the skin of the user generally are Merkel cells (SA I) and Meissner corpuscles (FA I) that are present at the boundary portion of the epidermis and the dermis, Ruffini endings (SA II) that are present in the dermis, and Pacinian corpuscles (FA II) that are present in the subcutis (FIG. 10). In the tissue of human skin, the depths from the skin surface of the epidermis, the dermis, and the subcutis are 0.06 to 0.2 [mm] for the epidermis, 2.0 to 2.2 [mm] for the dermis, and no less than 2.2 [mm] for the subcutis.

Figure 8:
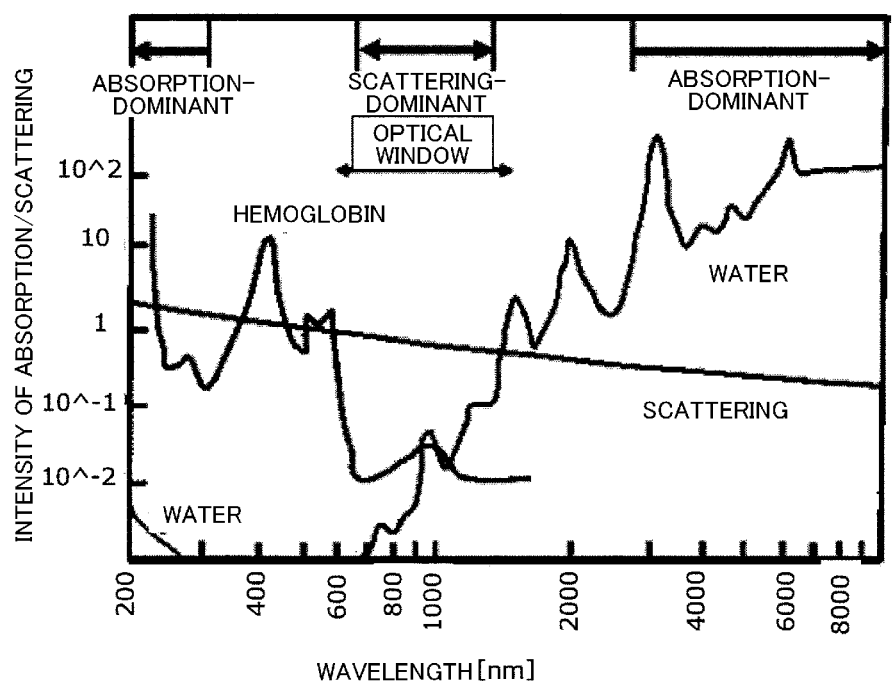
FIG. 8 is a diagram for describing a laser beam and pressure waves according to a second embodiment.

Assuming that the test site a of the user is a common biological object including the human body, the primary light-absorbing substances present in the test site a are water and hemoglobin that is present in blood as an oxygen transporting medium. The values of light absorption coefficients differ between water and hemoglobin for each wavelength, as illustrated in FIG. 8 (Reference 4: Japanese Ministry of Education, Culture, Sports, Science and Technology, "Dai 3 Syou Kenkou na Kurashi ni Kiyo Suru Hikari (Chapter 3 Light that Contributes to Healthful Living)" [online], [Searched Jul. 2, 2019], Internet <http://www.mext.go.jp/b_menu/shingi/gijyutu/gijyutu3/toushin/attach/1333543.htm>, FIG. 2).

Figure 9:
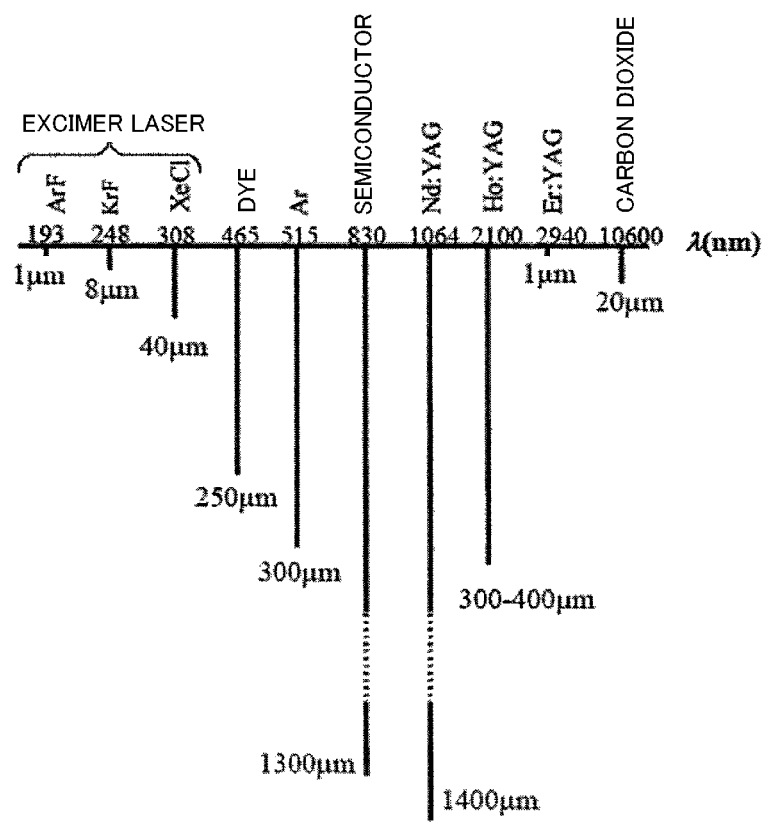
FIG. 9 is a diagram for describing the laser beam and pressure waves according to the second embodiment.

Accordingly, the depth that various types of lasers penetrate into the biological object tissue at each wavelength is generally as in FIG. 9 (Reference 4: FIG. 3). In order to cause absorption of light of the laser beam L near the epidermis, the wavelength of the laser beam L emitted from the light source 13 may be set to no higher than 500 [nm] or no lower than 2 [µm]. Also, in order to cause absorption of light of the laser beam at the dermis, the wavelength of the laser beam emitted from the light source 13 may be set to near-infrared rays of 800 [nm] to approximately 1.6 [µm].

As described above, the Merkel cells (SA I), Meissner corpuscles (FA I), Ruffini endings (SA II), and Pacinian corpuscles (FA II) each are present at different depths from the surface of the skin, and these tactile receptors each differ in anatomical positions and frequencies of pressure waves that can be sensed.

The light source 13 according to the present embodiment employs a wavelength-variable light source, and selects the wavelength of the laser beam L by which the test site a is to be irradiated in accordance with the tactile receptors regarding which application of stimulation is desired, thereby varying the penetration depth of the laser beam L from the surface of the skin (FIG. 10). By controlling the wavelength of the laser beam L, desired tactile receptors can be selectively made to sense. Also, the wavelength of the laser beam L can be temporally changed by the wavelength-variable light source.

Specifically, a case of generating pressure waves at the test site a to stimulate the Merkel cells (SA I) and Meissner corpuscles (FA I) that are present at the boundary portion of the epidermis and the dermis will be considered. In this case, the wavelength of the laser beam L emitted from the light source 13 preferably is around 100 [nm] to 500 [nm], or no lower than 2 [µm] (laser beam L1: wavelength λ1, pressure wave W1, and laser beam L3: wavelength λn, pressure wave W3, in FIG. 10).

Also, a case of generating pressure waves at the test site a to stimulate the Ruffini endings (SA II) that are present in the dermis and the Pacinian corpuscles (FA II) that are present in the subcutis will be considered. In this case, the wavelength of the laser beam L emitted from the light source 13 preferably is around 800 [nm] to 1.6 [µm] (laser beam L2 in FIG. 10: wavelength λk, pressure wave W2). Thus, by emitting laser beams with different wavelengths from the light source 13 for irradiation of the test site a, the tactile receptors can be selectively stimulated, and tactile sensation feedback to be presented to the user can be controlled.

A distributed feedback (DFB) laser, a distributed Bragg reflector (DBR) laser, and an external resonator laser can be used as the wavelength-selective light source used as the light source 13.

The DFB laser has a grating (diffractive grating) on an active layer, and realizes wavelength variance by adjusting the amount of current injection or the temperature of the device.

In a DBR laser, no grating is disposed on the active layer, and DBR grating is disposed on both sides or one side of the active region. Also, normally, the DBR laser is provided with a phase adjustment region for performing phase matching. The DBR laser realizes wavelength variance by the carrier plasma effect that occurs by injecting current into a DBR region that is independent from the active layer.

In an external resonator laser, wavelength variance is realized by disposing a mirror on the outer side of an active region, and mechanically moving the mirror. In the case of the light source 13 using a semiconductor layer, a mirror according to MEMS (Micro Electro Mechanical Systems) is used, in order to reduce the foot print (device size).

As described above, according to the tactile sensation presentation device 1 of the second embodiment, a wavelength-variable light source is used for the light source 13, and accordingly tactile receptors can be selectively stimulated, and tactile sensation feedback presented to the user can be controlled more precisely.

Also, the tactile sensation presentation device 1 temporally changes the wavelength of the laser beam emitted from the light source 13, and accordingly the tactile receptors to which a stimulus is applied by pressure waves can be temporally changed.

Third Embodiment

Next, a third embodiment of the present invention will be described. In the following description, configurations that are the same as in the above-described first and second embodiments are denoted by the same signs, and description thereof will be omitted.

A case has been described in the first and second embodiments in which the cyclically intensity-modulated laser beam L is emitted using one light source 13, by which the test site a is irradiated. Conversely, a plurality of light sources 13 is used in the third embodiment.

In order to provide the user with clearer tactile sensation feedback, there is a need to stimulate a great number of tactile receptors present in the test site a of the skin of the user and so forth of the user, over a broader range at the same time. The spot diameter of the laser beam L emitted from the light source 13 can be broadened using a spatial optical system such as a lens or the like. However, broadening the spot diameter reduces the light intensity per unit area accordingly.

For example, an assumption will be made that the test site a at which the user is presented with tactile sensation is a fingertip of the user. In a case of broadening the spot size of a single laser beam L in accordance with the size of the fingertip at the test site a, laser light sources of which light intensity that can create pressure waves of an intensity that is sufficient to induce tactile sensation can be demanded can be said to be extremely rare.

Accordingly, in the present embodiment, a plurality of light sources 13 is used to irradiate the test site a by a plurality of laser beams L at the same time, thereby stimulating a great number of tactile receptors contained in the test site a.

Figure 11:
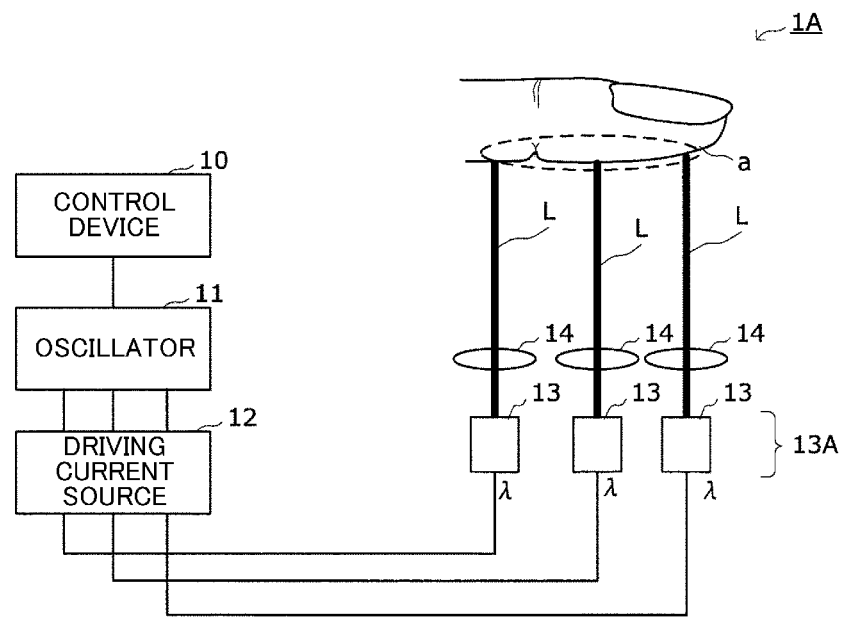
FIG. 11 is a block diagram illustrating a configuration of a tactile sensation presentation device according to a third embodiment.

A tactile sensation presentation device 1A is provided with the control device 10, the oscillator 11, the driving current source 12, a plurality of light sources 13, and a plurality of lenses 14, as illustrated in FIG. 11.

The oscillator 11 and the driving current source 12 can have a plurality of channels, in accordance with the number of light sources 13. The control device 10 generates control signals indicating the oscillation waveform and the oscillation frequency for the oscillator 11. The control device 10 can also generate control signals so that each channel of the plurality of channels included oscillates at a different waveform.

The oscillator 11 oscillates at the oscillation waveform and the oscillation frequency set in advance, in accordance with the control signal, and outputs modulation signals from the channels. The oscillator 11 can oscillate at different oscillation frequencies for each of the channels. Signals output from each of the channels of the oscillator 11 may have a different phase from each other.

The driving current source 12 drives each of the plurality of light sources 13 by applying driving current to each of the light sources 13, on the basis of the modulation signals from the oscillator 11 input to each of the channels. More specifically, the driving current source 12 performs cyclic intensity modulation of laser beams emitted from each of the light sources 13. The driving current source 12 can supply a different driving current to each light source 13 for each channel.

Each of the plurality of light sources 13 emits a laser beam that is cyclically intensity-modulated by the oscillation waveform of the oscillator 11. Semiconductor lasers that are the same are arrayed in parallel in the plurality of light sources 13, as illustrated in FIG. 11. For example, the light sources 13 are laid out spaced from each other, such that irradiation by the laser beams emitted from each of the light sources 13 to the area of the test site a at the fingertip or the like of the user is performed at the same time.

Also, although the oscillation wavelengths of each of the plurality of light sources 13 are the same, a configuration may be made in which the modulation frequencies and phases differ from each other.

Figure 12:
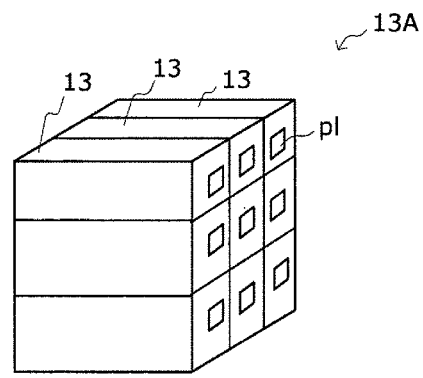
FIG. 12 is a block diagram illustrating a configuration example of a two-dimensional semiconductor laser array according to the third embodiment.

Also, a two-dimensional semiconductor laser array 13A such as illustrated in FIG. 12 can be used as a separate configuration example of the plurality of light sources 13. Alternatively, the plurality of light sources 13 may be realized by a surface-emitting semiconductor laser array device. A more compact configuration of the plurality of light sources 13 can be made by such a semiconductor laser that is formed as an array.

The plurality of lenses 14 shapes the forms of the laser beams incident from the light sources 13, and emits the laser beams. The beam-shaped laser beams are cast on different positions of the test site a.

The test site a is irradiated by the laser beams from the light sources 13, and pressure waves are generated at each of the irradiation positions by the photoacoustic effect. Each of the plurality of pressure waves that is generated propagates through the tissue of the skin at the test site a, and arrives at the tactile receptors. Thus, control is performed such that different pressure waves are generated in the proximity of a great number of tactile receptors.

As described above, according to the tactile sensation presentation device 1 of the third embodiment, the test site a at the skin surface of the user is irradiated by the plurality of laser beams L that is cyclically intensity-modulated by using the plurality of light sources 13. Accordingly, a greater amount of pressure waves due to the photoacoustic effect can be generated in the region of the test site a, and can apply a stimulus to a greater number of tactile receptors at the same time. As a result, varied tactile sensation feedback can be presented to the user.

Also, a configuration is made in which each of the laser beams L emitted from the plurality of light source 13 is modulated by a different modulation frequency, and also each has a different phase, in which generation of pressure waves is controlled more precisely. Accordingly, more varied tactile sensation feedback can be presented to the user.

Also, the plurality of light sources 13 can be configured in a more compact manner by using a two-dimensional semiconductor laser array 13A or a surface-emitting laser array device as the plurality of light sources 13. With respect to this point, in a case of presenting tactile sensation feedback to the skin or the like of the user using a vibrator such as an actuator as in a conventional example, the device including the vibrator and so forth is often positioned in the proximity of the test site a such as a hand of the user or the like. Accordingly, a certain amount of space is necessary for placing the vibrator and so forth. However, in the present embodiment, the plurality of light sources 13 can be formed into an array and conserve space, and accordingly application of the tactile sensation presentation device 1 becomes easier.

Fourth Embodiment

Next, a fourth embodiment of the present invention will be described. In the following description, configurations that are the same as in the above-described first through third embodiments are denoted by the same signs, and description thereof will be omitted.

A case has been described in the third embodiment in which the plurality of light sources 13 is used and the test site a is irradiated by the plurality of cyclically intensity-modulated laser beams L. In comparison with this, in the fourth embodiment, the plurality of light sources 13 is used in the same way as in the third embodiment, but the oscillation wavelength of each of the light sources 13 differs.

As described with FIG. 8, FIG. 9, and FIG. 10, the penetration depth into the skin differs depending on the wavelength of the light, and accordingly, the tactile receptors that can be stimulated also differ. The plurality of light sources 13 according to the present embodiment performs irradiation of the test site a by laser beams of which the wavelengths each differ, at the same time, and stimulate tactile receptors bearing a plurality of different sense organs at the same time.

The configuration of the tactile sensation presentation device 1A according to the present embodiment is the same as the configuration of the tactile sensation presentation device 1A according to the third embodiment described in FIG. 11.

Each of the plurality of light sources 13 emits a laser beam L that is cyclically intensity-modulated by the oscillation waveform of the oscillator 11, and of which the wavelength is different. A laser beam L of which the wavelength is set in advance is output from each light source 13. The wavelength of each laser beam is set in accordance with the anatomical position of each tactile receptor, and the penetration depth of each laser beam L into the skin at the test site a of the user is controlled.

Also, the plurality of light sources 13 can be the two-dimensional semiconductor laser array 13A or a surface-emitting semiconductor laser array device, as described in FIG. 12. In this case, a configuration can be made in which each of the light sources 13 in the array or in the device have different oscillation wavelengths from each other.

The test site a near the skin of the user is irradiated by the plurality of laser beams L emitted from the plurality of light sources 13. Each of the plurality of laser beams by which the test site a is irradiated is cyclically intensity-modulated by a different modulation frequency, and each has a different phase and wavelength.

Now, the plurality of light sources 13 described in the third embodiment is controlled such that the position of generation of pressure waves by the photoacoustic effect is in the proximity of the tactile receptors present in the tissue of the test site a, by appropriately changing the modulation frequencies and the phases of the plurality of laser beams L emitted. That is to say, the penetration depth of the plurality of laser beams L into the skin from the plurality of light sources 13 described in the third embodiment is uniform ($\lambda$), and is two-dimensional (FIG. 1i).

In comparison with this, each of the plurality of laser beams L emitted from the plurality of light sources 13 according to the present embodiment has a different wavelength, and the penetration depth into the skin at the test site a is controlled (FIG. 10). Accordingly, the tactile sensation presentation device 1A according to the present embodiment can three-dimensionally control generation of pressure waves near the skin at the test site a, and even more varied tactile sensation feedback can be presented to the user.

Fifth Embodiment

Next, a fifth embodiment of the present invention will be described. In the following description, configurations that are the same as in the above-described first through fourth embodiments are denoted by the same signs, and description thereof will be omitted.

A case has been described in the first through fourth embodiments in which the beamform of the laser beam L emitted from the light source 13 is shaped at the lens 14, and is cast on the test site a of the skin or the like of the user. In comparison with this, in the fifth embodiment, a light deflector is further provided, and is placed on the optical path between the lens 14 and the test site a and that deflects and scans the laser beam L. The light deflector is an optical processing device that changes spatial conditions including the emission direction of the laser beam L emitted from the light source 13.

Figure 13:
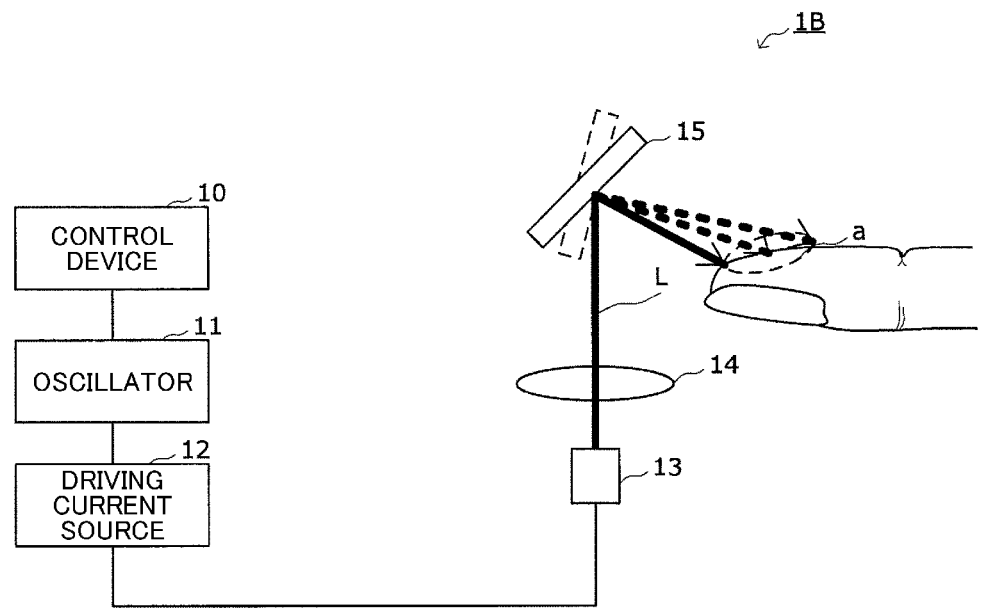
FIG. 13 is a block diagram illustrating a configuration of a tactile sensation presentation device according to a fifth embodiment.

FIG. 13 is a block diagram illustrating the configuration of a tactile sensation presentation device 1B according to the present embodiment. A Galvano mirror 15, for example, is used as the light deflector that the tactile sensation presentation device 1B is provided with. Also, the control device 10 controls the operations of the Galvano mirror 15 in the present embodiment. For example, the control device 10 supplies signals for controlling the rotating angle and the scanning speed of the Galvano mirror 15 to an unshown motor that the Galvano mirror 15 is provided with.

As illustrated in FIG. 13, the light source 13 emits the laser beam L that is cyclically intensity-modulated. The beamform of the laser beam L is shaped by the lens 14, and enters the Galvano mirror 15. The Galvano mirror 15 rotates at a rotational angle and speed set in advance, and casts the incident laser beam L onto the test site a on the skin surface of the user while scanning by deflecting at a deflection angle corresponding to the rotational angle. The rotational angle of the Galvano mirror 15 can be set in accordance with the range of the test site a.

Upon the test site a being irradiated by the laser beam L spatially sweeping the region of the test site a, the position at which pressure waves are generated by the photoacoustic effect can be temporally changed. In accordance with this, the tactile receptors at which tactile sensation is induced by applying a stimulus from the pressure waves can be temporally changed. For example, the user can be induced with a sensation as if something were moving over the fingertip at the test site a.

Figure 14:
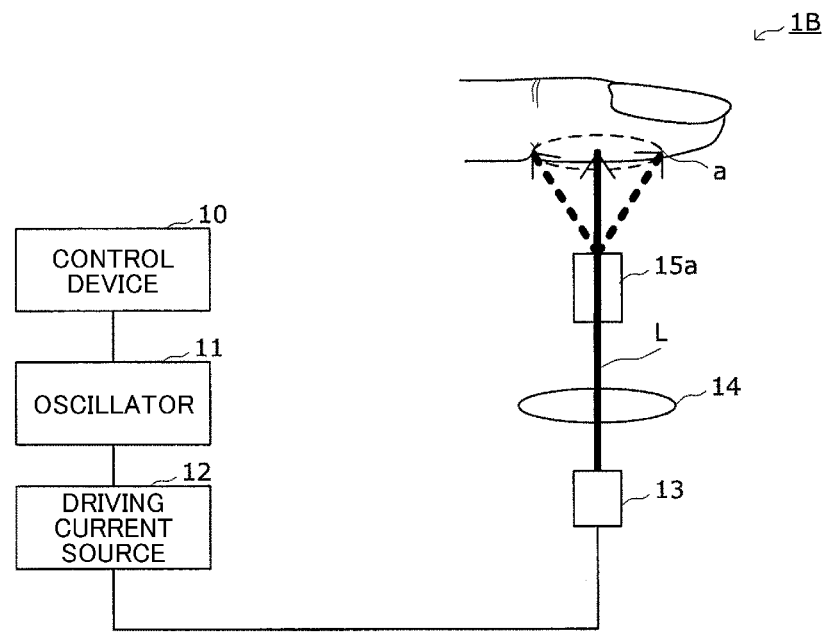
FIG. 14 is a block diagram illustrating a configuration of the tactile sensation presentation device according to the fifth embodiment.

Note that besides the Galvano mirror 15, an electro-optical crystal 15a such as illustrated in FIG. 14, liquid crystal, or the like, can be used as an optical device spatially sweeping the laser beam L over the surface at the test site a. In this case, the control device 10 can generate an electric field to be applied to the electro-optical crystal 15a or the liquid crystal, and control the optical properties of the electro-optical crystal 15a or the liquid crystal, for example.

As described above, according to the tactile sensation presentation device 1B of the fifth embodiment, an optical deflector such as the Galvano mirror 15 or the like deflects the laser beam L emitted from the light source 13 and cyclically intensity-modulated, to spatially scan the surface of the test site a. Accordingly, the tactile sensation presentation device 1B can present tactile sensation feedback to the user that changes temporally.

Sixth Embodiment

Next, a sixth embodiment of the present invention will be described. In the following description, configurations that are the same as in the above-described first through fifth embodiments are denoted by the same signs, and description thereof will be omitted.

A case has been described in the first through fifth embodiments in which the beamform of the laser beam L emitted from the light source 13 and cyclically intensity-modulated is shaped at the lens 14, and is cast on the test site a. In comparison with this, in the sixth embodiment, an optical device that controls the focal point of the laser beam L is provided, and is placed on the optical path between the lens 14 and the test site a. This optical device is included in optical processing devices that change spatial conditions including the wavefront shape of the laser beam L emitted from the light source 13.

Figure 15:
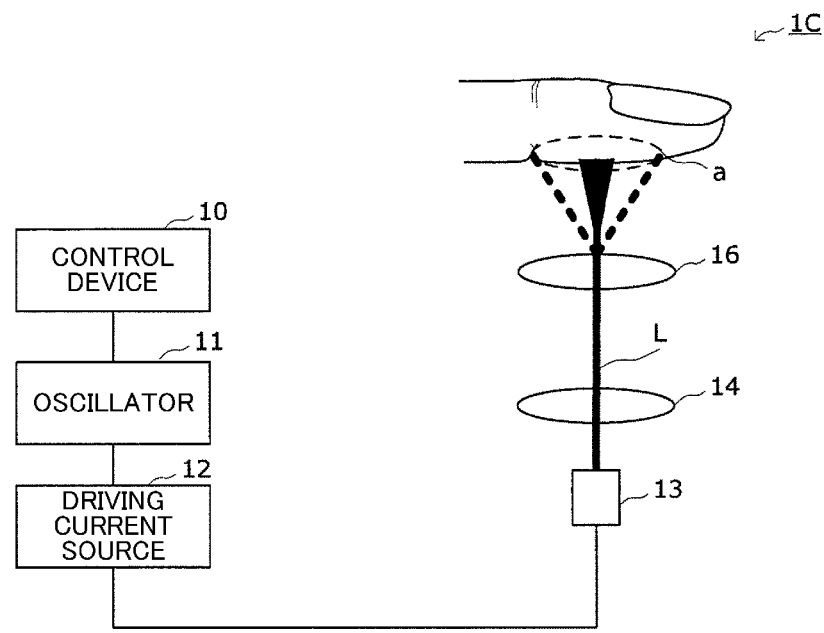
FIG. 15 is a block diagram illustrating a configuration of a tactile sensation presentation device according to a sixth embodiment.

FIG. 15 is a block diagram illustrating the configuration of a tactile sensation presentation device 1C according to the present embodiment. The tactile sensation presentation device 1C has a varifocal lens 16 along an optical axis between the lens 14 and the test site a. The varifocal lens 16 makes the focal length of the laser beam L emitted from the light source 13 and beam-shaped at the lens 14 to be variable. That is to say, the varifocal lens 16 controls the wavefront of the laser beam L.

The varifocal lens 16 can also dynamically control the focal length of the laser beam L. For example, the control device 10 can generate signals controlling the optical properties of the varifocal lens 16, such as the refractive index, and control the varifocal lens 16.

The varifocal lens 16 can change the focal length of the laser beam L, and change the size of the focal point of the laser beam L cast on the test site a. By enlarging or reducing the spot diameter in the test site a of the laser beam L by which the test site a is irradiated, the tactile receptors regarding which pressure waves are generated and which stimulus is applied can be temporally changed. For example, a sensation can be induced on the fingertip of the user such as the stimulus becoming broader or narrower.

Figure 16:
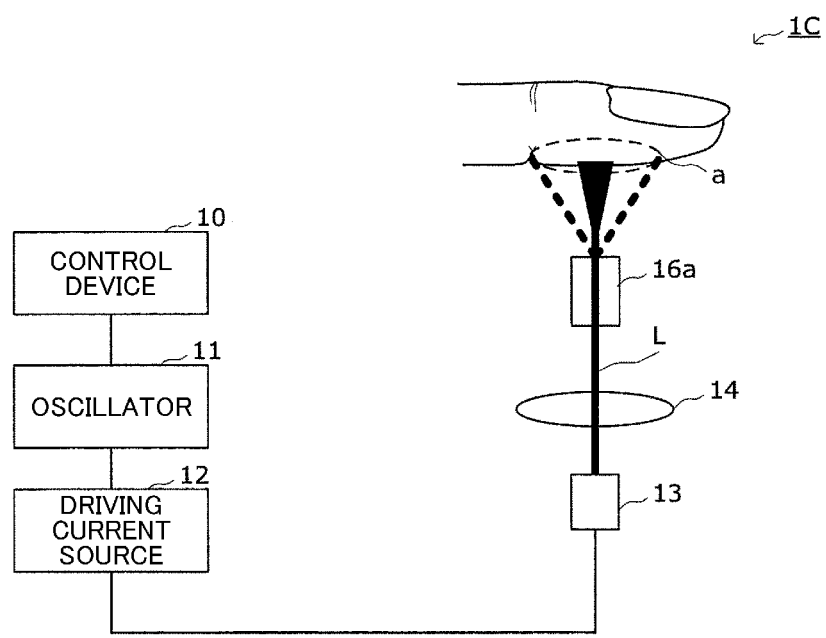
FIG. 16 is a block diagram illustrating a configuration of the tactile sensation presentation device according to the sixth embodiment.

Note that besides the varifocal lens 16, an electro-optical crystal 16a such as illustrated in FIG. 16 or the like can be used as an optical device that varies the focal point of the laser beam L emitted from the light source 13 and cyclically intensity-modulated. In this case, the control device 10 can generate an electric field to be applied to the electro-optical crystal 16a, and control the optical properties of the electro-optical crystal 16a.

As described above, according to the tactile sensation presentation device 1C of the sixth embodiment, the focal point of the laser beam L emitted from the light source 13 and cyclically intensity-modulated can be controlled, and accordingly the spot diameter of the laser beam L cast on the test site a can be enlarged or reduced, and even more varied tactile sensation feedback can be presented to the user.

Seventh Embodiment

Next, a seventh embodiment of the present invention will be described. In the following description, configurations that are the same as in the above-described first through sixth embodiments are denoted by the same signs, and description thereof will be omitted.

A tactile sensation presentation device 1D according to the seventh embodiment is further provided with a light-absorbing material 18 that absorbs the laser beam L by which the test site a is irradiated, and generates pressure waves by the photoacoustic effect.

The light-absorbing material 18 absorbs light of the wavelength of the laser beam L emitted from the light source 13, and propagates the pressure waves generated by the photoacoustic effect to the skin at the test site a. The light-absorbing material 18 is a material that has an absorbance band of the wavelength of the laser beam L by which the test site a is irradiated, and a material that matches the acoustic impedance of the biological object is used. Using a material that matches the acoustic impedance of the biological object enables the pressure waves generated at the light-absorbing material 18 due to the photoacoustic phenomenon to be transmitted to the test site a without being attenuated or reflected.

Macromolecule materials, such as gels and rubbers, for example, can be used as the light-absorbing material 18. Also, in a case where the laser beam L by which the test site a is irradiated is near-infrared light, a material such as rubber containing water can be used for the light-absorbing material 18. Alternatively, the light-absorbing material 18 may be a skin phantom.

Figure 17:
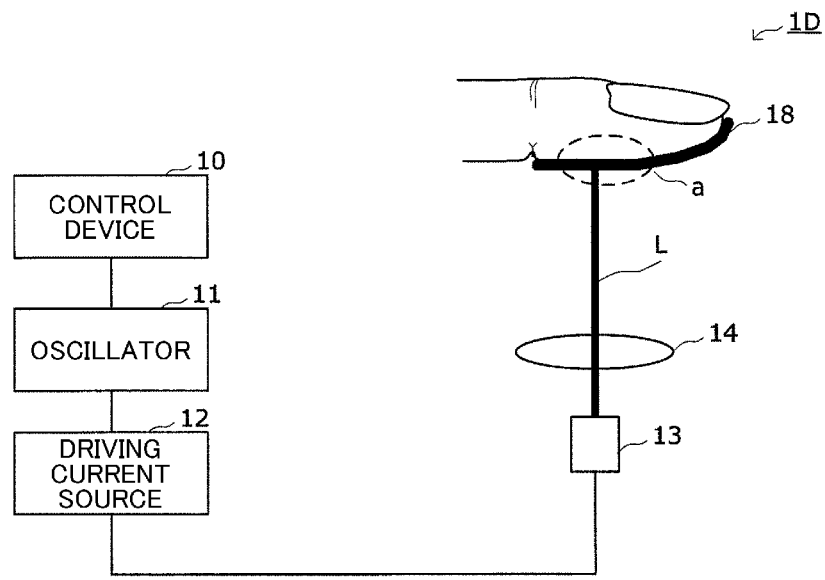
FIG. 17 is a block diagram illustrating a configuration of a tactile sensation presentation device according to a seventh embodiment.

The light-absorbing material 18 is disposed covering the skin of the user at the test site a, as illustrated in FIG. 17. More preferably, the light-absorbing material 18 may have a form of a glove or a form of a rubber thimble, for the light-absorbing material 18 to be in close contact with the skin at the test site a. Alternatively, the light-absorbing material 18 can be applied to the skin like a bandage, to be in close contact. Disposing the light-absorbing material 18 so as to be in close contact with the skin at the test site a in this way enables the laser beam L cast from the light source 13 to be efficiently converted into pressure waves.

Also, the light-absorbing material 18 covers the test site a of the user, and accordingly damage to the biological object by irradiation of the laser beam L can be prevented.

As described above, according to the tactile sensation presentation device 1D of the seventh embodiment, the laser beam L that is emitted from the light source 13 and that is cyclically intensity-modulated, is applied via the light-absorbing material 18, and accordingly the laser beam L is absorbed more efficiently, and pressure waves can be generated efficiently.

Eighth Embodiment

Next, an eighth embodiment of the present invention will be described. In the following description, configurations that are the same as in the above-described first through seventh embodiments are denoted by the same signs, and description thereof will be omitted.

In the first through seventh embodiments, the test site a is irradiated by the cyclically intensity-modulated laser beam L, and pressure waves generated by the photoacoustic effect stimulate the tactile receptors in the skin, thereby presenting tactile sensation feedback to the user. In comparison with this, in the eighth embodiment, a warm sensation is also presented in addition to tactile sensation feedback of an external mechanical stimulus.

Figure 18:
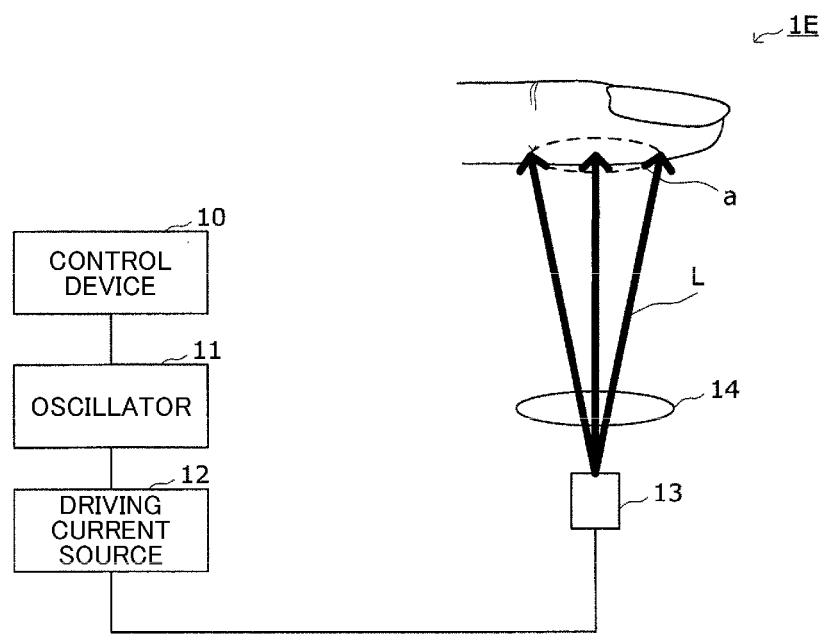
FIG. 18 is a block diagram illustrating a configuration of a tactile sensation presentation device according to an eighth embodiment.

FIG. 18 is a block diagram illustrating the configuration of a tactile sensation presentation device 1E according to an embodiment of the present invention. A direct current component is added to the modulation signal input to the driving current source 12 from the oscillator 11. The light source 13 emits a laser beam L modulated by a modulation frequency to which the direct current component is added. The laser beam L is beam-shaped at the lens 14, and is cast on the test site a. The laser beam L has a component in which the light intensity is constant, and the skin of the test site a irradiated thereby is heated. Thus, the receptors for a warm sensation that are present in the skin of the test site a are stimulated, and a warm sensation can be presented to the user.

Note that the light source 13 for presenting a warm sensation may have the same configuration as the light source 13 emitting the laser beam L that is cyclically intensity-modulated for presenting tactile sensation feedback, or separate light sources 13 may be used for each.

Also, besides a case of irradiation of a certain region of the test site a by a laser beam L modulated with the direct current component added, a low-frequency component that is drastically lower than the modulation frequency for signal modulation used for presenting tactile sensation feedback may be added to the laser beam L.

Also, the laser beam L from the light source 13 to which the direct current component or low-frequency component is added can be deflected and spatially scanned over the region of the test site a. By controlling the irradiation position or region of the surface of the test site a irradiated by the laser beam L in this way, presentation of a warm sensation over the entire test site a, or presentation of a warm sensation in a local region of the test site a can be realized. The control device 10 can add the direct current component to the modulation signals or generate low-frequency driving signals, and control the oscillator 11 and the driving current source 12.

As described above, according to the tactile sensation presentation device 1E of the eighth embodiment, the user can be presented with a warm sensation in addition to tactile sensation feedback.

Ninth Embodiment

Next, a ninth embodiment of the present invention will be described. In the following description, configurations that are the same as in the above-described first through eighth embodiments are denoted by the same signs, and description thereof will be omitted.

A case has been described in the first through eighth embodiments in which the test site a is irradiated by the laser beam L from the light source 13, in a state in which the test site a such as the hand or fingertip of the user is placed at a predetermined position. In comparison with this, in the ninth embodiment, a tactile sensation presentation device 1F further is provided with an image recognition device 19, monitoring the positional relation between the test site a of the user and the region irradiated by the laser beam L, and controlling irradiation of the test site a by the laser beam L.

Figure 19:
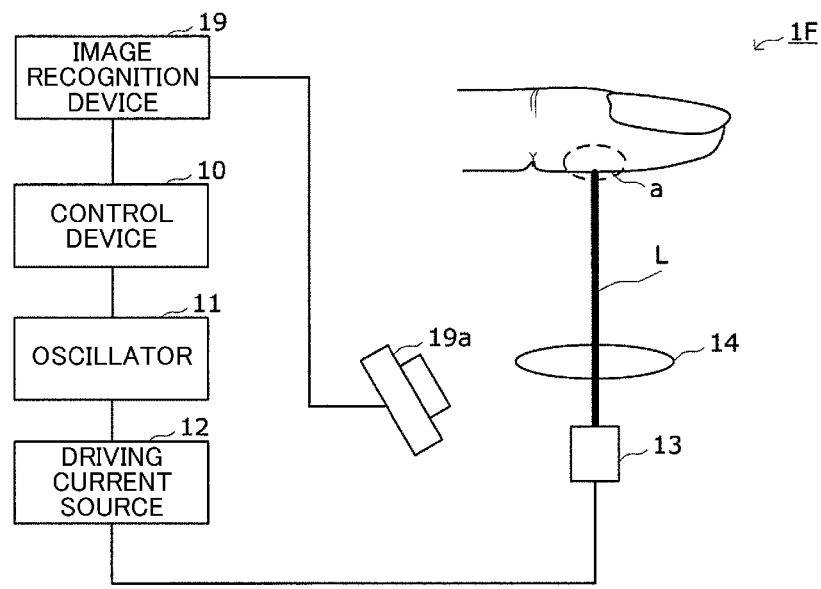
FIG. 19 is a block diagram illustrating a configuration of a tactile sensation presentation device according to a ninth embodiment.
Figure 20:
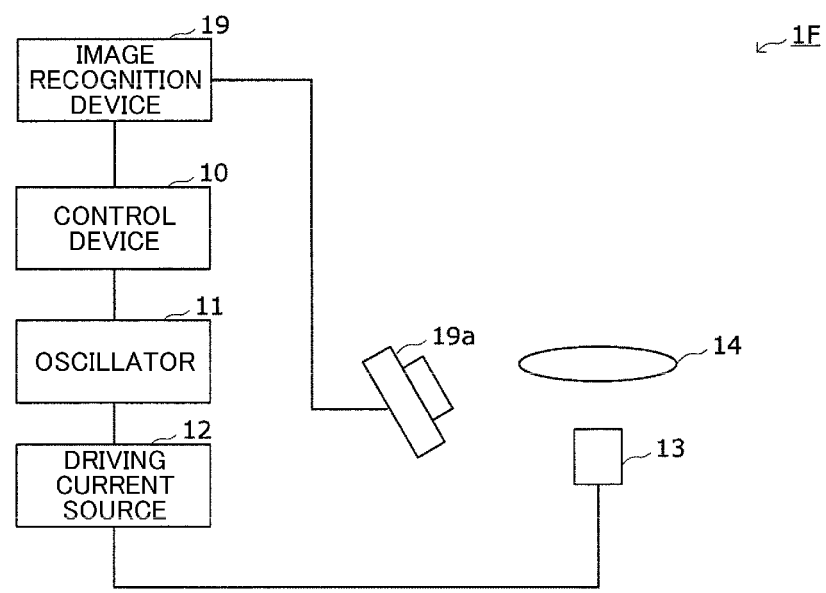
FIG. 20 is a block diagram illustrating a configuration of the tactile sensation presentation device according to the ninth embodiment.

FIG. 19 and FIG. 20 are block diagrams illustrating the configuration of the tactile sensation presentation device 1F according to the present embodiment. As illustrated in FIG. 19, the tactile sensation presentation device 1F is provided with the image recognition device 19, the control device 10, the oscillator 11, the driving current source 12, the light source 13, and the lens 14.

The image recognition device 19 is provided with a camera 19a. The camera 19a takes images showing the relation between the position of the test site a and the position irradiated by the laser beam L from the light source 13, and sends the taken images to the image recognition device 19.

The image recognition device 19 analyzes the images acquired from the camera 19a, and recognizes the positional relation such as the distance between the test site a and the lens 14 and the light source 13. More specifically, the image recognition device 19 analyzes the images, and recognizes whether or not the test site a is set, the distance from the light source 13 to the test site a, the irradiation position on the surface of the skin of the user by the laser beam L by the laser irradiation optical system (light source 13, lens 14), and the irradiation region.

The image recognition device 19 analyzes the images acquired by the camera 19a, and in a case in which at least one of the values of the distance from the light source 13 to the test site a, the irradiation position by the laser beam L from the laser irradiation optical system, and the irradiation region by the laser beam L, is not a value within a set range, for example, can output signals indicating deviation of these values.

The control device 10 adjusts the focal point position of the laser irradiation optical system on the basis of the results of image recognition and determination by the image recognition device 19, and adjusts the irradiation position of the laser beam L by the laser irradiation optical system, the irradiation range, and the focal point, so that the test site a is appropriately irradiated by the laser beam L.

Also, the image recognition device 19 analyzes images acquired from the camera 19a, and recognizes that the test site a such as the finger or the hand set in advance is not positioned, or that a part of the body other than the test site a, or an object, is positioned. In this case, the image recognition device 19 can send a stop signal to the control device 10 so that the laser beam L is not emitted from the light source 13, as illustrated in FIG. 19, for example.

Figure 21:
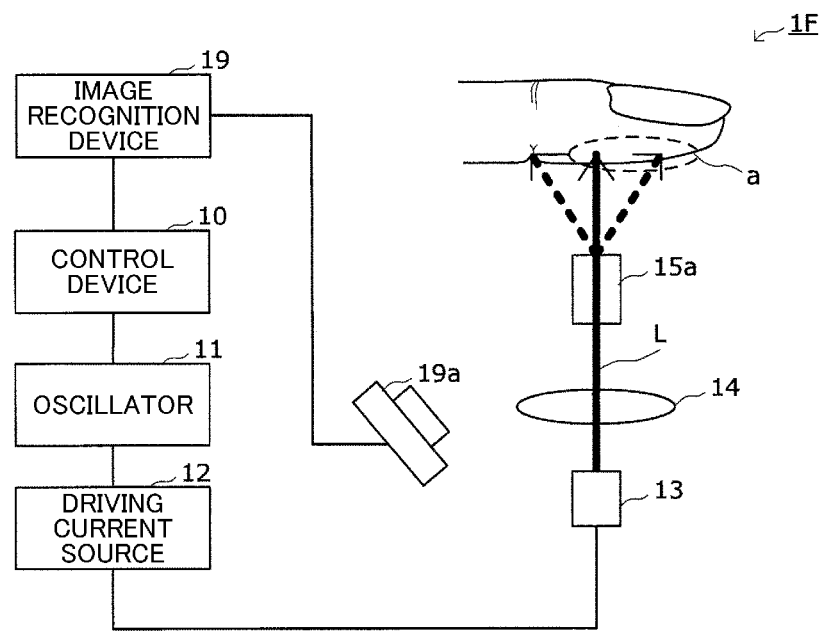
FIG. 21 is a block diagram illustrating a configuration of the tactile sensation presentation device according to the ninth embodiment.
Figure 22:
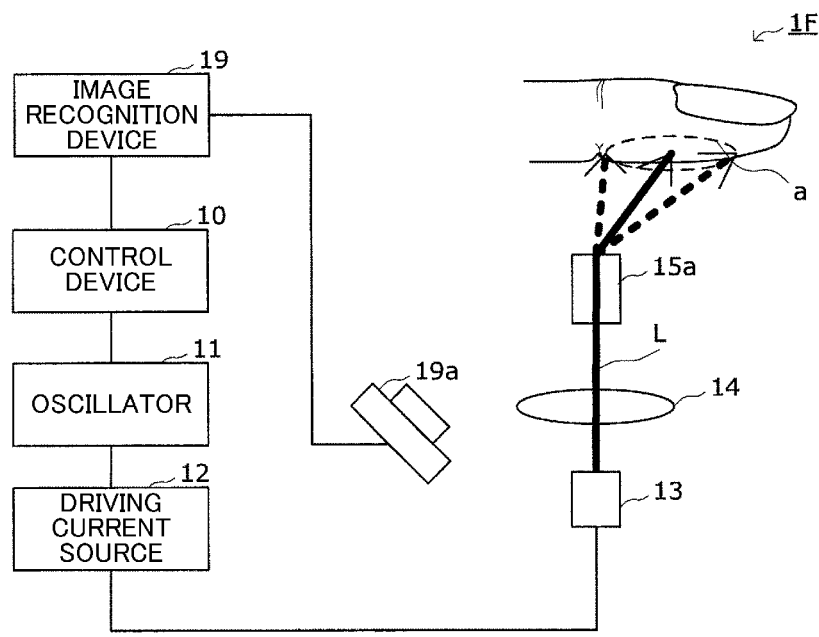
FIG. 22 is a block diagram illustrating a configuration of the tactile sensation presentation device according to the ninth embodiment.

FIG. 21 and FIG. 22 are block diagrams illustrating a modification of the tactile sensation presentation device 1F according to the present embodiment. As illustrated in FIG. 21, the image recognition device 19 analyzes images acquired by the camera 19a, and recognizes the relation between the position of the test site a and the position irradiated by the laser beam L. In the example of the tactile sensation presentation device 1F illustrated in FIG. 21 and FIG. 22, the electro-optical crystal 15a that deflects and emits the laser beam L is provided on the optical path between the lens 14 and the test site a.

In a case of judging that the position of the skin surface irradiated by the laser beam L is deviated from the position of the test site a on the basis of the images taken by the camera 19a, the image recognition device 19 sends a signal indicating the state of deviation between the test site a and the irradiation position by the laser beam L to the control device 10, for example.

The control device 10 controls the optical properties of the electro-optical crystal 15a on the basis of signals indicating the relation between the test site a and the irradiation position by the laser beam L input from the image recognition device 19, so that the laser beam L emitted from the light source 13 is cast on the position of the test site a. The control device 10 generates an electric field to be applied to the electro-optical crystal 15a, and controls the optical properties of the electro-optical crystal 15a or the liquid crystal.

The electro-optical crystal 15a deflects the laser beam L incident to the electro-optical crystal 15a in accordance with the electric field applied under control of the control device 10, so as to be cast on the test site a.

Figure 23:
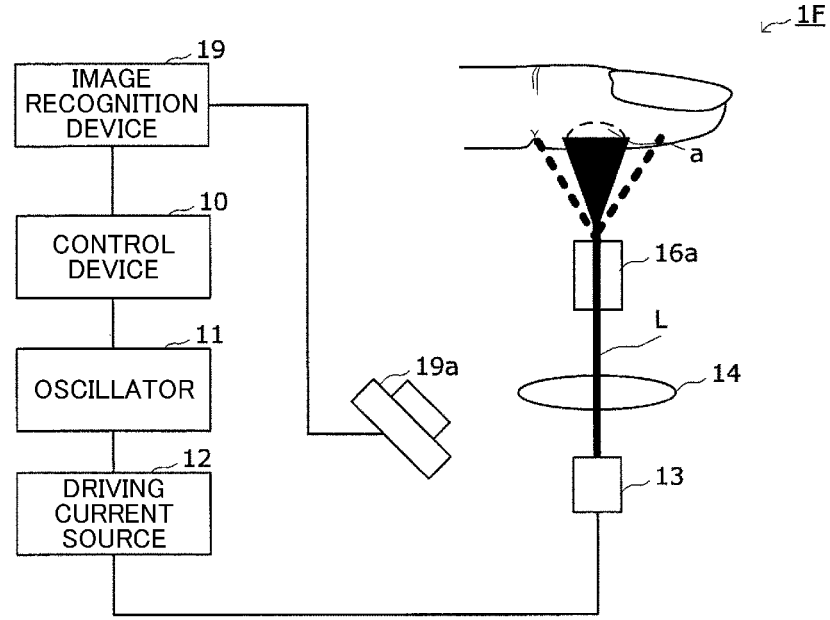
FIG. 23 is a block diagram illustrating a configuration of the tactile sensation presentation device according to the ninth embodiment.
Figure 24:
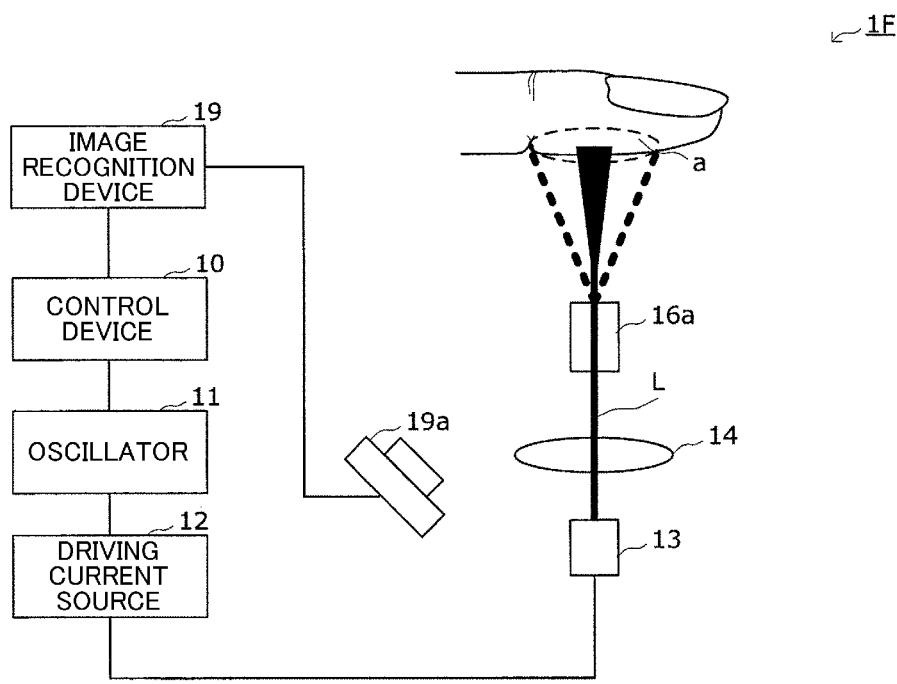
FIG. 24 is a block diagram illustrating a configuration of the tactile sensation presentation device according to the ninth embodiment.

FIG. 23 and FIG. 24 are block diagrams illustrating another modification of the tactile sensation presentation device 1F according to the present embodiment. In the example of the tactile sensation presentation device 1F illustrated in FIG. 22 and FIG. 23, the electro-optical crystal 16a that controls the focal point of the laser beam L is provided on the optical path between the lens 14 and the test site a.

The control device 10 controls the optical properties of the electro-optical crystal 16a on the basis of signals indicating the relation between the position of the test site a and the irradiation position by the laser beam L input from the image recognition device 19, so that the laser beam L emitted from the light source 13 is cast on the region of the test site a. The control device 10 generates an electric field to be applied to the electro-optical crystal 16a, and controls the optical properties of the electro-optical crystal 16a.

The electro-optical crystal 16a irradiates the test site a by the laser beam L of a spot diameter corresponding to the region of the test site a, in accordance with the electric field applied.

Also, the tactile sensation presentation device 1F can monitor the positional relation between the setting position of the test site a and the focal point position of the laser irradiation optical system by the image recognition device 19, and dynamically control the optical properties of the electro-optical crystal 15a and 16a so that the region of the test site a is constantly irradiated by the laser beam L.

Figure 25:
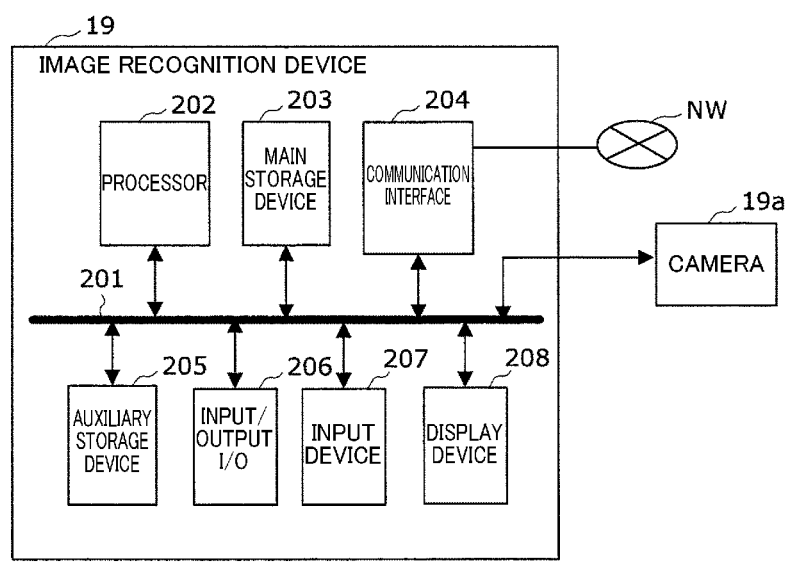
FIG. 25 is a block diagram illustrating an example of a computer configuration that realizes an image recognition device according to the ninth embodiment.

FIG. 25 is a block diagram illustrating an example of a computer configuration realizing the image recognition device 19 according to the present embodiment.

As illustrated in FIG. 25, the image recognition device 19 can be realized by, for example, a computer provided with a processor 202, a main storage device 203, a communication interface 204, an auxiliary storage device 205, an input/output I/O 206, an input device 207, and a display device 208, which are connected via a bus 201, and a program that controls these hardware resources. The image recognition device 19 is connected to the control device 10 via the bus 201.

The processor 202 is configured of a CPU, GPU, or the like. Note that in a case of the processor 202 being configured of a plurality of GPUs, information relating to image signals is divided as appropriate, and parallel processing is performed by the plurality of GPUs.

A program for the processor 202 to perform various types of control and computation is stored in the main storage device 203 in advance. Image recognition processing is realized by the processor 202 and the main storage device 103.

The communication interface 204 is an interface circuit for network connection between the image recognition device 19 and various types of external electronic equipment.

The auxiliary storage device 205 is configured of a recording medium that can be read from and written to, and a drive device for reading and writing various types of information, such as programs and data, from and to the recording medium. A hard disk and semiconductor memory such as flash memory can be used as the storage medium for the auxiliary storage device 205.

The auxiliary storage device 205 has a program storage region that stores a program for executing recognition processing on images that the image recognition device 19 acquires from the camera 19a. The auxiliary storage device 205 may have a backup region or the like for backup of the aforementioned data and programs, or the like, for example.

The input/output I/O 206 is configured of an I/O terminal that inputs signals from external equipment, and outputs signals to external equipment.

The input device 207 is configured of a keyboard, touch panel, or the like, and outputs signals in accordance with external operation input.

The display device 208 is configured of a liquid crystal display or the like.

The camera 19a can convert optical signals into image signals and generate moving images and still images. More specifically, the camera 19a has an image-capturing device such as a CCD (charge-coupled device) image sensor, a CMOS image sensor, or the like, and images incident light from an image-capturing region onto a light-receiving face and converts the light into electrical signals. Communication between the camera 19a and the image recognition device 19 may be performed wirelessly.

Note that the image recognition device 19 may be configured of a common computing device with the control device 10. Also, in a case in which the image recognition device 19 and the control device 10 are separate hardware configurations, these can be provided distributed on the communication network NW.

As described above, according to the tactile sensation presentation device 1F of the ninth embodiment, the spatial positional relation between the laser irradiation optical system and the test site a is analyzed from the images taken by the camera 19a, and the irradiation position of the laser beam L by the laser irradiation optical system, the irradiation range, and the focal point are adjusted. Accordingly, the laser beam L can be cast on the test site a more accurately.

Also, in a case in which an object other than the object test site a is placed at the irradiation position of the laser beam L, the tactile sensation presentation device 1F stops operations, and accordingly a region other than the test site a, such as a naked eye for example, can be prevented from being irradiated by the laser beam L.

Note that the functional blocks, modules, and circuits described with relation to the embodiments disclosed here can be executed using a general-use processor, GPU, digital signal processor (DSP), application-specific integrated circuit (ASIC), field programmable gate arraY (FPGA) or other such programmable logic devices, discrete gates or transistor logic, discrete hardware parts, or combinations of any of the aforementioned, designed to realize the above-described functions.

Although a microprocessor can be used as the general-use processor, a processor, a controller, a microcontroller, or state equipment, according to conventional technology, can be used instead. The processor can be realized as, for example, a combination of a DSP and microprocessor, a plurality of microprocessors, one or more microprocessors connected to a DSP core, or a combination of calculation devices according to any such configuration.

Although embodiments of the tactile sensation presentation device and tactile sensation presentation method according to the present invention have been described above, the present invention is not limited to the described embodiments, and various modifications conceivable by one skilled in the art may be made within the scope of the invention described in the Claims.

REFERENCE SIGNS LIST

1 Tactile sensation presentation device
10 Control device

11 Oscillator
12 Driving current source
13 Light source
14 Lens
101, 201 Bus
102, 202 Processor
103, 203 Main storage device
104, 204 Communication interface
105, 205 Auxiliary storage device
106, 206 Input/output I/O
107, 207 Input device
208 Display device

The invention claimed is:

1. A tactile sensation presentation device comprising:
an electromagnetic wave source configured to emit an electromagnetic wave toward a region of a skin surface of a biological object; and
a control device configured to generate a control signal configured to control the electromagnetic wave source and cause the electromagnetic wave source to emit the electromagnetic wave in a modulated manner, wherein the control signal further comprises a signal configured to modulate a frequency of the electromagnetic wave emitted from the electromagnetic wave source, wherein the electromagnetic wave is configured to irradiate the region of the skin surface, be absorbed at the region of the skin surface, and generate a pressure wave that is a thermoelastic wave by a photoacoustic phenomenon, the generated pressure waves configured to stimulate tactile receptors in the skin of the biological object, wherein the signal is further configured to modulate the frequency of the electromagnetic wave emitted from the electromagnetic wave source to target specific tactile receptors in the skin of the biological object.

2. The tactile sensation presentation device according to claim 1, further comprising an optical processing device configured to irradiate the region of the skin surface while changing a spatial condition including an emission direction of the electromagnetic wave or a wavefront shape of the electromagnetic wave emitted from the electromagnetic wave source.

3. The tactile sensation presentation device according to claim 2, wherein the optical processing device is configured to irradiate the region of the skin surface while spatially sweeping the electromagnetic wave emitted from the electromagnetic wave source.

4. The tactile sensation presentation device according to claim 1, wherein the electromagnetic wave source comprises a plurality of semiconductor lasers.

5. The tactile sensation presentation device according to claim 4, wherein each of the plurality of semiconductor lasers has a different oscillation wavelength.

6. A tactile sensation presentation method, the method comprising:
generating a control signal that controls an electromagnetic wave source and causes the electromagnetic wave source to emit an electromagnetic wave in a modulated manner, wherein the electromagnetic wave source comprises a wavelength-variable electromagnetic wave source in which a wavelength of the electromagnetic wave is variable; and
emitting the electromagnetic wave from the electromagnetic wave source toward a region of a skin surface of a biological object, wherein the electromagnetic wave irradiates the region of the skin surface, is absorbed at the region of the skin surface, and generates a pressure wave that is a thermoelastic wave by a photoacoustic phenomenon, wherein emitting the electromagnetic wave from the electromagnetic wave source further comprises:
emitting the electromagnetic wave at a first frequency targeting a first set of tactile receptors in the skin surface of the biological object,
emitting the electromagnetic wave at a second frequency targeting a second set of tactile receptors in the skin surface of the biological object, the second frequency being different than the first frequency.

7. The method according to claim 6, further comprising irradiating the region of the skin surface while changing a spatial condition including an emission direction of the electromagnetic wave or a wavefront shape of the electromagnetic wave emitted from the electromagnetic wave source.

8. The method according to claim 7, further comprising irradiating the region of the skin surface while spatially sweeping the electromagnetic wave emitted from the electromagnetic wave source.

9. The method according to claim 6, wherein the electromagnetic wave source comprises a plurality of semiconductor lasers.

10. The method according to claim 9, wherein each of the plurality of semiconductor lasers has a different oscillation wavelength.

11. The tactile sensation presentation device according to claim 1, wherein the signal is configured to modulate an intensity of the electromagnetic wave emitted from the electromagnetic wave source.

12. The method according to claim 6, wherein the control signal further comprises a signal that modulates a frequency of the electromagnetic wave emitted from the electromagnetic wave source.

13. The tactile sensation presentation device according to claim 2, wherein the optical processing device comprises a mirror configured to rotate, the rotating mirror configured to irradiate the region of the skin surface while spatially sweeping the electromagnetic wave emitted from the electromagnetic wave source.

14. The tactile sensation presentation device according to claim 2, wherein the optical processing device comprises an electro-optical crystal configured to irradiate the region of the skin surface while spatially sweeping the electromagnetic wave emitted from the electromagnetic wave source.

15. A tactile sensation presentation method, the method comprising:
generating a plurality of control signals that control a plurality of electromagnetic wave sources and cause the electromagnetic wave sources to emit a plurality of electromagnetic waves in a modulated manner, wherein each of the plurality of control signals further comprise a signal that modulates a frequency of the electromagnetic wave emitted from the respective electromagnetic wave source, wherein each of the plurality of electromagnetic wave sources comprises a wavelength-variable electromagnetic wave source in which a wavelength of the electromagnetic wave is variable; and
emitting the plurality of electromagnetic waves from the plurality of electromagnetic wave sources toward a region of a skin surface of a biological object, wherein the electromagnetic waves irradiate the region of the skin surface, is absorbed at the region of the skin surface, and generate a pressure waves that are thermoelastic waves by photoacoustic phenomenon, each of the plurality of electromagnetic waves from the plurality of electromagnetic wave sources targeting a different type of tactile receptor in the skin surface of the biological object.

16. The tactile presentation device of claim 1, wherein the signal is further configured to:
   modulate the frequency of the electromagnetic wave emitted from the electromagnetic wave source at a first frequency, and
   modulate the frequency of the electromagnetic wave emitted from the electromagnetic wave source at a second frequency, the second frequency being lower than the first frequency, the first frequency targeting Pacinian corpuscle tactile receptors, the second frequency targeting Merkel cell tactile receptors.

17. The tactile presentation method of claim 6, wherein emitting the electromagnetic wave at the first frequency and emitting the electromagnetic wave at the second frequency are performed simultaneously.

18. The tactile presentation method of claim 6, wherein emitting the electromagnetic wave at the first frequency is performed by a first wave source and emitting the electromagnetic wave at the second frequency is performed by a second wave source.

19. The tactile presentation method of claim 15, wherein the plurality of electromagnetic wave sources comprise a first electromagnetic wave source and a second electromagnetic wave source, wherein emitting the plurality of electromagnetic waves from the plurality of electromagnetic wave sources comprises:
   emitting a first electromagnetic wave, by the first electromagnetic wave source, at a first frequency targeting Merkel cell tactile receptors and Meissner corpuscle tactile receptors; and
   emitting a second electromagnetic wave, by the second electromagnetic wave source, at a second frequency targeting Pacinian corpuscle tactile receptors.

\* \* \* \* \*